(12) United States Patent
Medalion et al.

(10) Patent No.: US 11,647,030 B2
(45) Date of Patent: May 9, 2023

(54) DETECTING FRAUD RINGS IN INFORMATION TECHNOLOGY SYSTEMS

(71) Applicant: Intuit Inc., Mountain View, CA (US)

(72) Inventors: Shiomi Medalion, Lod (IL); Yiftach Elgat, Rehovot (IL)

(73) Assignee: Intuit Inc., Mountain View, CA (US)

( * ) Notice: Subject to any disclaimer, the term of this patent is extended or adjusted under 35 U.S.C. 154(b) by 504 days.

(21) Appl. No.: 16/797,858

(22) Filed: Feb. 21, 2020

(65) Prior Publication Data

US 2021/0266335 A1 Aug. 26, 2021

(51) Int. Cl.
| | | |
|---|---|---|
| H04L 29/08 | (2006.01) | |
| G06F 16/435 | (2019.01) | |
| G06F 3/16 | (2006.01) | |
| H04L 29/06 | (2006.01) | |
| H04N 21/4627 | (2011.01) | |
| H04L 65/60 | (2022.01) | |
| H04L 9/40 | (2022.01) | |
| G06F 16/28 | (2019.01) | |
| G06N 5/04 | (2023.01) | |
| G06N 20/00 | (2019.01) | |
| G06N 5/01 | (2023.01) | |

(52) U.S. Cl.
CPC ........ *H04L 63/1416* (2013.01); *G06F 16/285* (2019.01); *G06N 5/01* (2023.01); *G06N 5/04* (2013.01); *G06N 20/00* (2019.01)

(58) Field of Classification Search
CPC ... H04L 63/1416; G06F 16/285; G06N 20/00; G06N 5/003; G06N 5/04

USPC .......................................................... 726/23
See application file for complete search history.

(56) References Cited

U.S. PATENT DOCUMENTS

| | | | |
|---|---|---|---|
| 10,657,591 B1* | 5/2020 | Chen | G06Q 20/4016 |
| 10,657,971 B1* | 5/2020 | Newstadt | G06N 20/00 |
| 2010/0169137 A1* | 7/2010 | Jastrebski | G06Q 20/04 705/30 |
| 2011/0313965 A1* | 12/2011 | Madhok | G06Q 10/00 705/4 |
| 2018/0032938 A1* | 2/2018 | Scriffignano | G06Q 10/0635 |
| 2018/0109507 A1* | 4/2018 | Caldera | H04L 63/08 |
| 2019/0207960 A1* | 7/2019 | Chu | G06N 20/00 |
| 2019/0236695 A1* | 8/2019 | McKenna | G06N 7/005 |
| 2020/0334228 A1* | 10/2020 | Matyska | G06N 20/00 |
| 2020/0349573 A1* | 11/2020 | Dong | G06N 5/022 |
| 2021/0019762 A1* | 1/2021 | Bosnjakovic | G06N 5/022 |
| 2021/0073855 A1* | 3/2021 | Francia | G06Q 30/0248 |
| 2021/0174367 A1* | 6/2021 | Harris | H04L 41/12 |

\* cited by examiner

*Primary Examiner* — Tauqir Hussain
(74) *Attorney, Agent, or Firm* — Ferguson Braswell Fraser Kubasta PC

(57) ABSTRACT

A method for detecting fraud rings involves clustering unknown users into unknown user clusters based on a grouping attribute. The method further involves, for each of the unknown user clusters, determining aggregated features including at least one quantification of at least one homogeneity attribute across the unknown users in the unknown user cluster. The method also involves, for each of the unknown user clusters, determining a predictive suspiciousness score based on the aggregated features, determining that at least one of the unknown user clusters is suspicious based on the determined predictive suspiciousness scores, and taking a protective action for the at least one suspicious unknown user cluster.

22 Claims, 8 Drawing Sheets

Example Grouping Attributes 202

| Account-ID | Grouping Attributes | |
|---|---|---|
| | Device-ID | True-ISP |
| 1234 | dba63b6da3c | CoffeeNetworks |
| 1235 | dba63b6da3c | CoffeeNetworks |
| 1236 | dba63b6da3c | CoffeeNetworks |
| 1237 | a58da1e942d | ChocoNetworks |

Example Homogeneity Attributes 204

| Account-ID | Homogeneity Attributes | |
|---|---|---|
| | Email | State |
| 1234 | shlomi1@email.com | NY |
| 1235 | shlomi2@email.com | CA |
| 1236 | shlomi3@email.com | CA |
| 1237 | shlomi4@email.com | CA |

Example Labeling Attributes 206

| Account-ID | Labeling Attributes | |
|---|---|---|
| | Declined | Write-Off |
| 1234 | TRUE | 120$ |
| 1235 | FALSE | 0$ |
| 1236 | TRUE | 240$ |
| 1237 | FALSE | 0$ |

Example Aggregated Features 208

| Cluster-ID | Aggregating Attributes | | | | | Label |
|---|---|---|---|---|---|---|
| | Email Name+Number | Max Email Provider | Free Email | Max State | | |
| dba-Coffee | 100% | 66% | 100% | 66% | | TRUE |
| a58-Choco | 40% | 50% | 30% | 50% | | FALSE |

*FIG. 2*

DETECTING FRAUD RINGS IN INFORMATION TECHNOLOGY SYSTEMS

BACKGROUND

Software services provided to users via information technology systems may be used to perform transactions, to provide information, etc. A dishonest party may attempt to access a software service in a fraudulent manner, e.g., to steal information, to perform fraudulent transactions, etc. Increasingly, dishonest parties form fraud rings consisting of multiple fraudulent users, accessing the software service using multiple accounts, generated for the software service with the expectation that most attempts to conduct fraudulent activity fail, while one or more may succeed. Fraud rings may pose a considerable threat because fraudulent users organized in a fraud ring frequently may be organized, methodical, and able to mask their steps efficiently. As a consequence, the damage caused by fraud rings may be greater than damage caused by individual bad actors. Identifying accounts associated with fraud rings and differentiating them from legitimate accounts may, thus, be beneficial.

SUMMARY

In general, in one aspect, one or more embodiments relate to a method for detecting fraud rings. The method includes clustering unknown users into unknown user clusters based on a grouping attribute; for each of the unknown user clusters, determining aggregated features comprising at least one quantification of at least one homogeneity attribute across the unknown users in the unknown user cluster; for each of the unknown user clusters, determining a predictive suspiciousness score based on the aggregated features; determining that at least one of the unknown user clusters is suspicious based on the determined predictive suspiciousness scores; and taking a protective action for the at least one suspicious unknown user cluster.

In general, in one aspect, one or more embodiments relate to a method for detecting fraud rings. The method includes clustering known users into known user clusters based on a grouping attribute; for each of the known user clusters, determining aggregated features comprising at least one quantification of at least one homogeneity attribute across the known users in the known user cluster; for each of the known users, determining a label-based suspiciousness score based on at least one labeling attribute, wherein the at least one labeling attribute identifies a fraud-related event; for each of the known user clusters, determining the label-based suspiciousness score based on the label-based suspiciousness scores associated with the known users in the known user cluster; binarily labeling each of the known user clusters based on the associated label-based suspiciousness score and a suspiciousness threshold to distinguish suspicious known user clusters from non-suspicious known user clusters; and training a suspiciousness classifier using the at least one homogeneity attribute and the binary label associated with the known user clusters.

In general, in one aspect, one or more embodiments relate to a method for detecting fraud rings. The method includes clustering known users into known user clusters based on a grouping attribute; for each of the known user clusters, determining aggregated features comprising at least one quantification of at least one homogeneity attribute across the known users in the known user cluster; clustering the known user clusters into cluster clouds based on the at least one homogeneity attribute in the aggregated features; for each of the known users, determining a label-based suspiciousness score based on at least one labeling attribute, wherein the at least one labeling attribute identifies a fraud-related event; for each of the known user clusters, determining the label-based suspiciousness score based on the label-based suspiciousness scores associated with the known users in the known user cluster; binarily labeling each of the known user clusters based on the associated label-based suspiciousness score and a suspiciousness threshold to distinguish suspicious known user clusters from non-suspicious known user clusters; and flagging at least one of the cluster clouds based on the at least one cluster cloud comprising suspicious known user clusters and non-suspicious known user clusters with a ratio that exceeds a threshold.

In general, in one aspect, one or more embodiments relate to a system for detecting fraud rings. The system includes: a computer processor; and an account assessment engine executing on the computer processor configured to: cluster unknown users into unknown user clusters based on a grouping attribute; for each of the unknown user clusters, determine aggregated features comprising at least one quantification of at least one homogeneity attribute across the unknown users in the unknown user cluster; for each of the unknown user clusters, determine a predictive suspiciousness score based on the aggregated features; determine that at least one of the unknown user clusters is suspicious based on the determined predictive suspiciousness scores; and take a protective action for the at least one suspicious unknown user cluster.

In general, in one aspect, one or more embodiments relate to a system for detecting fraud rings. The system includes: a computer processor; and an account assessment engine executing on the computer processor configured to: cluster known users into known user clusters based on a grouping attribute; for each of the known user clusters, determine aggregated features comprising at least one quantification of at least one homogeneity attribute across the known users in the known user cluster; for each of the known users, determine a label-based suspiciousness score based on at least one labeling attribute, wherein the at least one labeling attribute identifies a fraud-related event; for each of the known user clusters, determine the label-based suspiciousness score based on the label-based suspiciousness scores associated with the known users in the known user cluster; binarily label each of the known user clusters based on the associated label-based suspiciousness score and a suspiciousness threshold to distinguish suspicious known user clusters from non-suspicious known user clusters; and train a suspiciousness classifier using the at least one homogeneity attribute and the binary label associated with the known user clusters.

In general, in one aspect, one or more embodiments relate to a system for detecting fraud rings. The system includes: a computer processor; and an account assessment engine executing on the computer processor configured to: cluster known users into known user clusters based on a grouping attribute; for each of the known user clusters, determine aggregated features comprising at least one quantification of at least one homogeneity attribute across the known users in the known user cluster; cluster the known user clusters into cluster clouds based on the at least one homogeneity attribute in the aggregated features; for each of the known users, determine a label-based suspiciousness score based on at least one labeling attribute, wherein the at least one labeling attribute identifies a fraud-related event; for each of the known user clusters, determine the label-based suspiciousness score based on the label-based suspiciousness scores associated with the known users in the known user cluster; binarily label each of the known user clusters based on the associated label-based suspiciousness score and a suspiciousness threshold to distinguish suspicious known user clusters from non-suspicious known user clusters; and flag at least one of the cluster clouds based on the at least one cluster cloud comprising suspicious known user clusters and non-suspicious known user clusters with a ratio that exceeds a threshold.

Other aspects of the invention will be apparent from the following description and the appended claims.

BRIEF DESCRIPTION OF DRAWINGS

FIG. 2 shows examples of attributes and features, in accordance with one or more embodiments of the disclosure.

DETAILED DESCRIPTION

Figure 1:
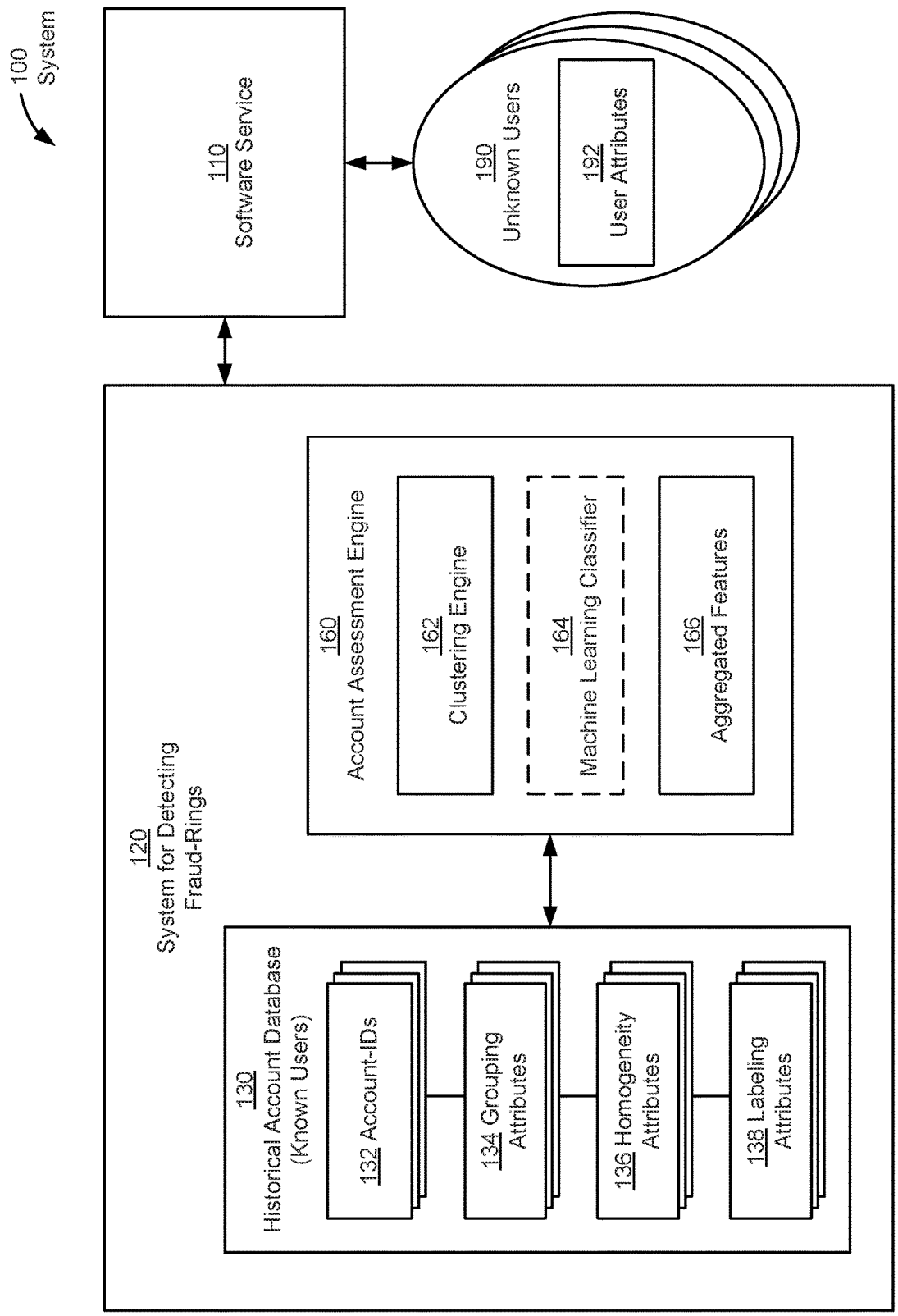
FIG. 1 shows a system for detecting fraudulent transactions, in accordance with one or more embodiments of the disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Embodiments of the disclosure assess users and user accounts for a software service to determine whether the users are likely to be members of a fraud ring. This determination may be made based on various attributes, as discussed in detail below.

More specifically, one or more attributes are assessed to detect homogeneity among a group of users. The homogeneity describes how similar the attributes of one member of the group are to those of other group members. Since accounts used by fraud rings are frequently generated in a systematic manner, an unusually low or high homogeneity often indicates that the group of users are members of a fraud ring.

Consider, for example, email addresses associated with accounts. Typically, email addresses of valid, non-fraudulent accounts have a certain level of homogeneity. For example, the email accounts may include combinations such as firstname.lastname, firstname_lastname, combinations of names, initials, and/or numbers, etc. Accordingly, based on these variations, an expected level of homogeneity may exist. It may be difficult for an organizer of a fraud ring to generate user accounts that accurately mimic this level of homogeneity. For example, when the email addresses associated with a fraud ring are generated systematically, e.g., using a highly stereotyped pattern, the generated email addresses may have a considerably higher homogeneity. Alternatively, the email addresses associated with the fraud ring may be generated pseudo-randomly, thereby resulting in considerably lower homogeneity. These deviations in the homogeneity may be detectable. Other attributes may show similar deviations. Various methods such as clustering and classification may be used to isolate users that are likely to be members of a fraud ring from regular users. The described methods may discover fraud rings that use professional tools to generate the accounts used for fraudulent activity, even though inspection of the individual accounts in isolation may not provide an indication for these accounts being fraudulent.

Turning to FIG. 1, a system (100) in accordance with one or more embodiments is shown. The system includes a software service (110) and a system for detecting fraud rings (120). Each of these components is subsequently described. The software service (110) may be accessed by unknown users (190). Unknown users may be users with newly generated accounts. These unknown users may or may not be members of fraud rings. The software service (110) may also be accessed by known users (not shown). Known users may be users that have a history of accessing the software service (110). The majority of the known users may be legitimate users, but some known users may also be fraudulent users that are members of fraud rings. A protective action may have been taken to protect against the known fraudulent users. Protective actions may include blocking the associated accounts, reporting the fraudulent users, etc.

In one or more embodiments, the system for detecting fraud rings (120) is configured to determine whether unknown users (190) are likely to be members of a fraud ring. Based on a review of the unknown users (190) by the system for detecting fraud rings (120), the unknown users (190) may become known users that are labeled as either legitimate or fraudulent.

Figure 7A:
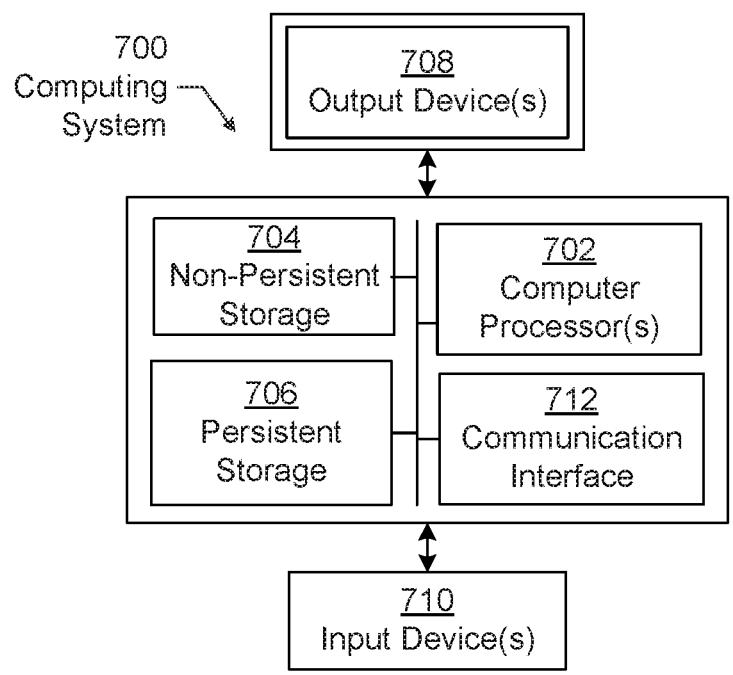
FIG. 7A and FIG. 7B show computing systems, in accordance with one or more embodiments of the disclosure.
Figure 7B:
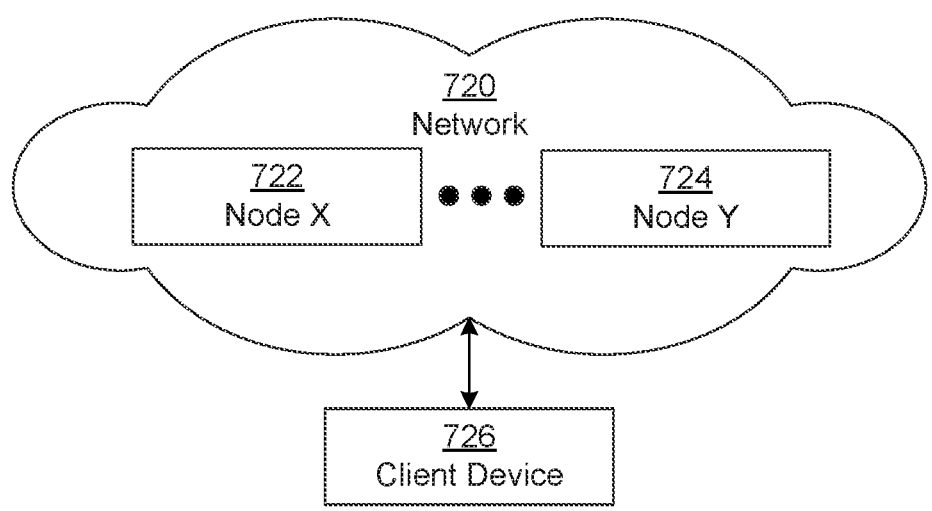

The software service (110) may provide one or more functionalities to support, for example, accounting tasks, tax calculation tasks, record keeping or other administrative tasks, multimedia applications, gaming, social network tasks, etc. The software service (110) may be hosted on a computing system. An example computing system is shown in FIGS. 7A and 7B. In one or more embodiments, at least parts of the software service (110) are cloud-hosted.

The system for detecting fraud rings (120) includes a historical account database (130) and an account assessment engine (160). The system for detecting fraud rings (120), including the historical account database (130) and the account assessment engine (160), and the software service (110) may be connected via a network (not shown). The network may include wide area network segments (such as the Internet) and/or local area network segments and may allow secured and/or non-secured communications.

The historical account database (130), in accordance with one or more embodiments, includes historical ground truth data of known users. The data in the historical account database (130) may be used by the account assessment engine (160) to assess unknown users (190) as described in detail with reference to the flowcharts of FIG. 3, FIG. 4A, FIG. 4B, FIG. 5A, and FIG. 5B. For each known user, the historical account database may include an account-ID (132), grouping attributes (134), homogeneity attributes (136), and labeling attributes (138). The format and structure of the historical account database (130) may differ, depending on the stored attributes. The historical account database (130) may be stored in non-volatile or volatile memory, e.g. on a hard disk drive or in RAM. The database (130) may be central or distributed.

The account IDs (132) may be used to uniquely identify accounts associated with known users. While one account ID may be assigned to one account, it is possible that multiple accounts are associated with the same user. An account ID may be of any format and may include numbers and/or characters.

In one or more embodiments, the grouping attributes (134) are attributes that are used to perform a grouping of users, as described in the flowcharts. Broadly speaking, any information that may be used to meaningfully distinguish different groups of users may be included in the grouping attributes (134). Such information may be based on data that characterizes the user, but that is not directly provided by the user himself or herself. Grouping attributes (134) may be considered user environment-related, but not directly user-related. For example, an internet service provider relied upon by the user, or a device ID may be user environment-related, but not directly user-related. In contrast, the user's email address may be considered user-related. Grouping attributes (134), in isolation, are not assumed to allow distinction between fraudulent and non-fraudulent users. Groups may be formed based on commonalities in the grouping attributes (134). Grouping attributes may include, for example, device IDs associated with users, internet service providers relied upon by the users, etc. More details are provided in FIG. 2.

In one or more embodiments, the homogeneity attributes (136) are attributes that are used to quantify a homogeneity within a group of users established based on the grouping attributes, as described in the flowcharts. Homogeneity attributes (136) may be based on data that is generated or influenced by the user. Homogeneity attributes may thus be user-related, in contrast to the grouping attributes which may be user environment-related. An example of a homogeneity attribute is the user's email address. The assumption is that information generated of influenced by users that are organized in a fraud ring may have an unusually high or unusually low homogeneity as a result of the coordinated effort by the fraud ring participants. In contrast to the grouping attributes (134), the homogeneity attributes (136) may thus allow to distinguish between benign users and users that are potential members of a fraud ring. Homogeneity attributes (136) may include, for example, email addresses associated with users, locations of the users, etc. More details are provided in FIG. 2.

In one or more embodiments, the labeling attributes (138), which are available for known users but not for unknown users, are attributes that are used to determine whether known users are likely to be legitimate or fraudulent, as described in the flowcharts. Labeling attributes may include, for example, declined payments, write-offs, etc. More details are provided in FIG. 2.

The account assessment engine (160), in accordance with one or more embodiments, includes a set of machine-readable instructions (stored on a computer-readable medium) which, when executed, perform one or more of the operations described in the flowcharts of FIG. 3, FIG. 4A, FIG. 4B, FIG. 5A, and FIG. 5B. The account assessment engine (160) may include a clustering engine (162). Depending on the implementation, the assessment engine (160) may include a machine learning classifier (164).

The clustering engine (162) may perform various clustering operations. For example, the clustering engine (162) may group users into user clusters based on the grouping attributes (134). This operation may be performed for the known users in the historical account database (130), but also for the unknown users (190). Various approaches may be used to perform the grouping of users into user clusters. For categorical data (such as the example grouping attributes (202) of FIG. 2), overlap may be used by counting the number of grouping attributes (134) that match between users. Specifically, when more grouping attributes (134) between two users match, the overlap between these two users increases, thus suggesting that these users should be assigned to the same user cluster. Many other similarity measures may be used to group categorical data. Other methods may be used for the grouping of continuous data. Such methods include clustering, which may include but is not limited to k-means clustering, dbscan clustering, hierarchical clustering, etc.

The clustering engine may also generate aggregated features (166). When user clusters are established based on the grouping attributes (134), for each user cluster, the associated homogeneity attributes are compiled to form the aggregated features (166), as described in the flowcharts and in FIG. 2. Broadly speaking, the aggregated features (166) summarize, for each user cluster, aspects derived from the homogeneity attributes (136). For example, based on users' email addresses, it may be concluded that in one user cluster, 100% of the users rely on a free email account, whereas in another user cluster, only 30% of the users rely on a free email account. This quantification of the users' homogeneity attributes (136) (in this example information derived from the users' email addresses) may be stored as aggregated features (166). The aggregated features (166) may be used to assess suspiciousness. Consider, for example, email addresses used as homogeneity attributes, and assume that known legitimate users in a user cluster have email addresses associated with a range of providers such as Gmail, Hotmail, Yahoo, etc. When all email addresses in the user cluster are combined in the aggregated features, a certain level of homogeneity may be computed based on the mix of email addresses in the user cluster. In contrast, a considerably higher or lower homogeneity may be computed from aggregated features (166) of groups associated with fraud rings. The number of homogeneity attributes considered in the aggregated features determines the dimensionality of the aggregated features. Many dimensions may exist. Each dimension may contribute to the homogeneity obtained for a user group. A determination whether a group of users is likely to be associated with a fraud ring may, thus, be made based on the homogeneity found in the aggregated features (166).

Optionally, the clustering engine (162) may perform another clustering operation to cluster the user clusters into cluster clouds based on the homogeneity attributes in the aggregated features (166). Groups of users that have similar homogeneity attributes may be clustered in the same cluster cloud. Prior to the clustering, a dimensionality reduction may be performed using, e.g., a principal component analysis (PCA). The clustering may then be performed using methods such as k-means clustering k-nearest neighbor clustering, dbscan clustering, hierarchical clustering, etc.

The machine learning classifier (164) may operate on the homogeneity attributes in the aggregated features (166) to classify users as either suspicious or non-suspicious. Suspicious users are likely to be members of a fraud ring, whereas non-suspicious users are likely to be legitimate users. The classifier may be any type of classification algorithm capable of performing a binary classification, for example, a decision tree, a random forest, a support vector machine, an XGBoost classifier, etc. The operation and training of the machine learning classifier is described below with reference to the flowcharts.

While FIG. 1 shows a configuration of components, other configurations may be used without departing from the scope of the disclosure. For example, various components may be combined to create a single component. As another example, the functionality performed by a single component may be performed by two or more components that may be communicatively connected using a network connection.

Turning to FIG. 2, examples of attributes and features, in accordance with one or more embodiments of the disclosure, are shown. More specifically, example grouping attributes (202), example homogeneity attributes (204), example labeling attributes (206), and example aggregated features (208) are shown for four user accounts represented by the account IDs 1234, 1235, 1236, and 1237. Grouping attributes and homogeneity attributes may include data gathered from account profiles, and other data that is available when a known or unknown user connects to the software service. For example, a device ID and an internet service provider may be identified as soon as a user is connected to the software service, and the users' email addresses and locations may be obtained from the user profiles generated when the users set up their user accounts. In addition, labeling attributes are available for known users. The labeling attributes may be used to indicate potentially fraudulent behavior. For example, the labeling attributes may include declined transactions and write-offs. Labeling attributes may not be available for unknown users because their behavior is still unknown.

The shown example grouping attributes (202) include a device ID and an internet service provider of each of the users. Other grouping attributes may be used in addition or alternatively, without departing from the disclosure. Broadly speaking, any information that may be used to meaningfully distinguish different groups of users may be included in the grouping attributes. Such information may be based on data that characterizes the user, but that is not directly provided by the user himself or herself. Grouping attributes may include, for example:
- whether a user enabled JavaScript on their device,
- a unique device identifier, a unique network identifier (router, cell tower, etc.),
- the country where the device is located, by IP address,
- the country where the proxy server used by the device is located, by IP address,
- the state or province where the device is located, by IP address,
- the state or province where the proxy server used by the device is located, by IP address,
- the internet service provider the device is using,
- the internet service provider the proxy server is using,
- whether or not an anomaly was detected in the screen aspect ratio of the device compared to device characteristics, like a pc with a mobile device resolution (may indicate virtual machine of a mobile operating system on a pc),
- whether or not an anomaly was detected in the screen resolution of the device compared to device characteristics, like a pc with a mobile device resolution (may indicate virtual machine of a mobile operating system on a pc),
- screen color depth,
- screen dpi resolution,
- screen overall resolution,
- page on the internet from which the user came to the system, like a google hit, or a shared link,
- browser language,
- a unique set of browser details, such as browser type, version, variation (e.g. mobile or desktop), etc.,
- operating system and its version,
- device language setting,
- the internet service provider the DNS address is attributed to,
- the state or province the DNS address is attributed to,
- an ID of the product being accessed by the user at the event that is recorded, etc.

One or more of these grouping attributes may be used to distinguish different groups of users. For example, the grouping may be performed based on the unique device identifier alone to cluster users who use the same device. Alternatively, the grouping may be performed based on a combination of the operating system and its version, a unique set of browser details, and the screen resolution. To make this example more specific, one may have one cluster of users that share the attributes [Windows 10.349, Chrome 64.727, res 1800×1200] and another cluster of users that share the attributes [Windows 10.349, Chrome 64.727, res 1200×600].

The shown example homogeneity attributes (204) include an email address and a state where the user is located. Other homogeneity attributes may be used in addition or alternatively without departing from the disclosure. Broadly speaking, any information that may be used to assess whether users in a group have characteristics that have a typical homogeneity or that are more or less homogeneous than typically expected may be included in the homogeneity attributes. Such information may be based on data that is generated or influenced by the user. The assumption is that information generated of influenced by users that are organized in a fraud ring may have a higher homogeneity as a result of the coordinated effort by the fraud ring participants. Alternatively, an unusually low homogeneity may be a result of the fraud ring participants intentionally randomizing the generated information to occlude the presence of the fraud ring. Homogeneity attributes may include, for example:
- Email features, such as:
  - whether or not the email prefix (prefix @suffix.com) contains any digits,
  - count of digits in the email prefix,
  - whether or not the email prefix contains any dots (.),
  - whether or not the email prefix contains any underscore (_),
  - whether or not the email prefix contains any plus (+),
  - whether or not an email uses only characters from the left side of the keyboard, indicating a hurried and time-efficient manual process that often characterizes fraudsters, a bucketing of letter count, can be 5, 10, 15 for example, whether or not the prefix is composed of digits only, Other features, such as:

a signup date
a state in which a business is registered
software products known as being used by the user
the name of a bank used by the user (Chase/Bank of America, etc.)
whether the user uploaded a company logo through the software service or not
whether or not the user uses any recurring invoices in the software service, etc.

Consider, for example, a group of users who all use the following configuration (grouping attributes): [Windows 10.349, Chrome 64.727, res 1200×600]. For these users, assume that the homogeneity attributes shown in the following table are found:

| User_ID | Email | Signup_date | Bank_name | State | Product |
|---|---|---|---|---|---|
| 1234 | Shlomi2222@gmail.com | Jan. 1, 2019 | Chase | FL | QuickBooks |
| 1235 | Shlomi3333@gmail.com | Jan. 1, 2019 | Chase | FL | QuickBooks |
| 1236 | Shlomi4444@gmail.com | Jan. 1, 2019 | Chase | FL | QuickBooks |
| 1237 | James_plumbing@gmail.com | Jun. 4, 2019 | Bank of A. | TX | TurboTax |

Based on these homogeneity attributes, one may conclude that the homogeneity is high, because three out of four users have four digits in the email address, the same signup date, the same bank, the same registered date, and use the same software product.

The shown example labeling attributes (206) include a flag for declined transactions and a quantification of write-offs. Other labeling attributes may include, for example, a known occurrence of fraud, whether the user has been denied as a merchant by a sales portal, whether chargebacks are associated with the user, and other elements that may be suspicious. In the example, for the users with the account IDs 1234 and 1236, transactions have been declined, and write-offs have been documented. In contrast, the users with the account IDs 1235 and 1237 have not been declined, and no write-offs have been documented. Assuming that declined transactions and write-offs are more likely to be associated with fraudulent users than with legitimate users, labeling attributes may be used to assign labels such as "fraudulent" and "legitimate" to users, with at least some confidence. If any one of the labeling attributes associated with a user indicate suspiciousness, the user may be considered suspicious. In the example of FIG. 2, a number of users may be considered suspicious based on their labeling attributes (206). In addition, the homogeneity for these users is high, based on the homogeneity attributes (204). Accordingly, one could conclude that the group of users, established based on the grouping attributes (202), is suspicious.

Note that while grouping attributes and homogeneity attributes may be available for known and unknown users, at least some of the labeling attributes may only be available for known users that have a history of transactions or other activity.

The example aggregated features (208) are derived from the example grouping attributes (202), the example homogeneity attributes (204), and the example labeling attributes (206). Two user clusters are shown: A first user cluster with the cluster ID "dba-Coffee", and a second user cluster with the cluster ID "A59-Choco. The two user clusters are generated based on the example grouping attributes (202). The first user cluster includes all user accounts associated with the device ID "dba63c6da3c" and the internet service provider "Coffee Networks". Accordingly, the first user cluster includes three users with the account IDs "1234", "1235", and "1236". The second user cluster includes a user account associated with the device ID "a59da1e9d3d" and the internet service provider "Choc® Networks". While not shown in the example, the second user cluster includes other users, in addition to the user with the account ID "1237". A description of the clustering of users into user clusters is provided below with reference to the flowcharts.

The example aggregated features (208) that are computed for the two user clusters are "email: name+number", "max email provider", "free email", "max state", and "label".

In the example, the feature "email: name+number" is computed based on an expected pattern of a name and a number. All email addresses, shlomi1@gmail.com, shlomi2@yahoo.com, shlomi3@gmail.com, and shlomi4@gmail.com in the example homogeneity attributes (204) meet the expected pattern. Accordingly, the value for the feature "email: name+number" for the first user cluster is 100%. Email addresses that would not meet the expected pattern are, for example, shlomi_a@gmail.com, shlomi$@gmail.com, 123shlomi@gmail.com, etc. The value for the feature "email: name+number" for the second user cluster is 40% because 60% of the users in the second user cluster have email addresses that deviate from the expected pattern. Note that only one of the users assigned to the second user cluster is shown in the example of FIG. 2 (the user with the account ID "1237"). Accordingly, the calculations performed to obtain the feature "email: name+number" for the second user cluster cannot be demonstrated here. Many other email address-based features may be analyzed. For example, email addresses may be analyzed for the presence of an underscore and a year to process email addresses in the format "name_year of birth"

In the example, the feature "max email provider" is based on the most frequently used email service provider in a user cluster. The first user cluster includes two users with a Gmail account and one user with a Yahoo account. Accordingly, 66% of the users use Gmail, whereas 33% of the users use Yahoo. The value for the feature "max email provider" is, thus, 66%. The value for the feature "max email provider" for the second user cluster is 50%. Note that only one of the users assigned to the second user cluster is shown in the example of FIG. 2 (the user with the account ID "1237"). Accordingly, the calculations performed to obtain the feature "max email provider" for the second user cluster cannot be demonstrated here.

In the example, the feature "free email" is based on whether users rely on free email accounts or commercial email accounts. The first user cluster includes two users with a Gmail account and one user with a Yahoo account. Gmail accounts and Yahoo accounts may be freely available. Accordingly, 100% of the users rely on free email accounts. The value for the feature "free email" for the second user cluster is 30%, suggesting that 70% of the users assigned to the second user cluster rely on commercial (e.g., corporate) email accounts. Note that only one of the users assigned to the second user cluster is shown in the example of FIG. 2 (the user with the account ID "1237"). Accordingly, the calculations performed to obtain the feature "free email" for the second user cluster cannot be demonstrated here.

In the example, the feature "max state" is based on the most common location (state) of the users in a user cluster. The first user cluster includes two users located in California (CA), and one user located in New York (N.Y.). Accordingly, 66% of the users are California-based, whereas 33% of the users are New York-based. The value for the feature "max state" is, thus, 66%. The value for the feature "max state" for the second user cluster is 50%. Note that only one of the users assigned to the second user cluster is shown in the example of FIG. 2 (the user with the account ID "1237"). Accordingly, the calculations performed to obtain the feature "max state" for the second user cluster cannot be demonstrated here.

In the example, the label is based on the example labeling attributes (206). A binary label is used to indicate whether a user group includes users that are likely to be fraudulent ("true") or legitimate ("false"). The first user cluster includes two users that have been declined and that have write-offs. One user has not been declined and has no write-offs. This serves as evidence that the first user cluster includes fraudulent users, and accordingly the label is set to "true". The majority of the users assigned to the second user cluster (although not shown), appear to be legitimate. Accordingly, the label is set to "false". Note that while grouping attributes and homogeneity attributes may be available for known and unknown users, at least some of the labeling attributes may only be available for known users that have a history of transactions or other activity. Accordingly, labeling attributes (206) may not be available for unknown users.

When examining the aggregated features "email: name+number", "max email provider", and "free email", derived from the homogeneity attributes, it is noticeable that these aggregated features have consistently higher values for the first user cluster, in comparison to the second user cluster. If an elevated homogeneity is considered as an indication for fraud rings, the first user cluster is more likely to be associated with a fraud ring than the second user cluster. This is compatible with the labeling of the first user cluster as fraudulent ("true") and the labeling of the second user cluster as legitimate ("false"). A more general description of computing aggregated features is provided below with reference to the flowcharts.

FIG. 3, FIG. 4A, FIG. 4B, FIG. 5A, and FIG. 5B show flowcharts in accordance with one or more embodiments of the disclosed technology. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Figure 3:
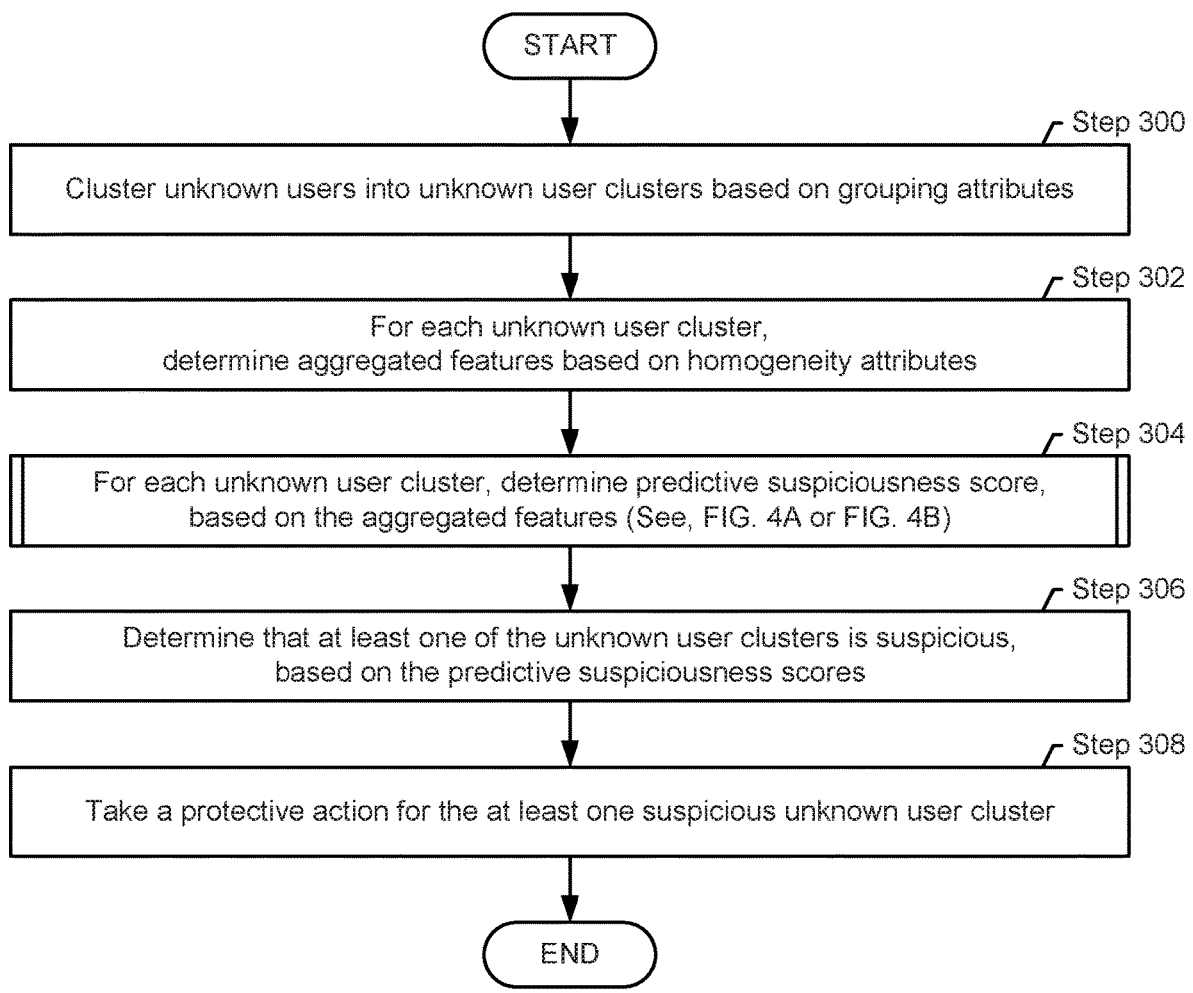
FIG. 3, FIG. 4A, FIG. 4B, FIG. 5A, and FIG. 5B show flowcharts describing the detecting of fraud rings in information technology networks, in accordance with one or more embodiments of the disclosure.
Figure 5A:
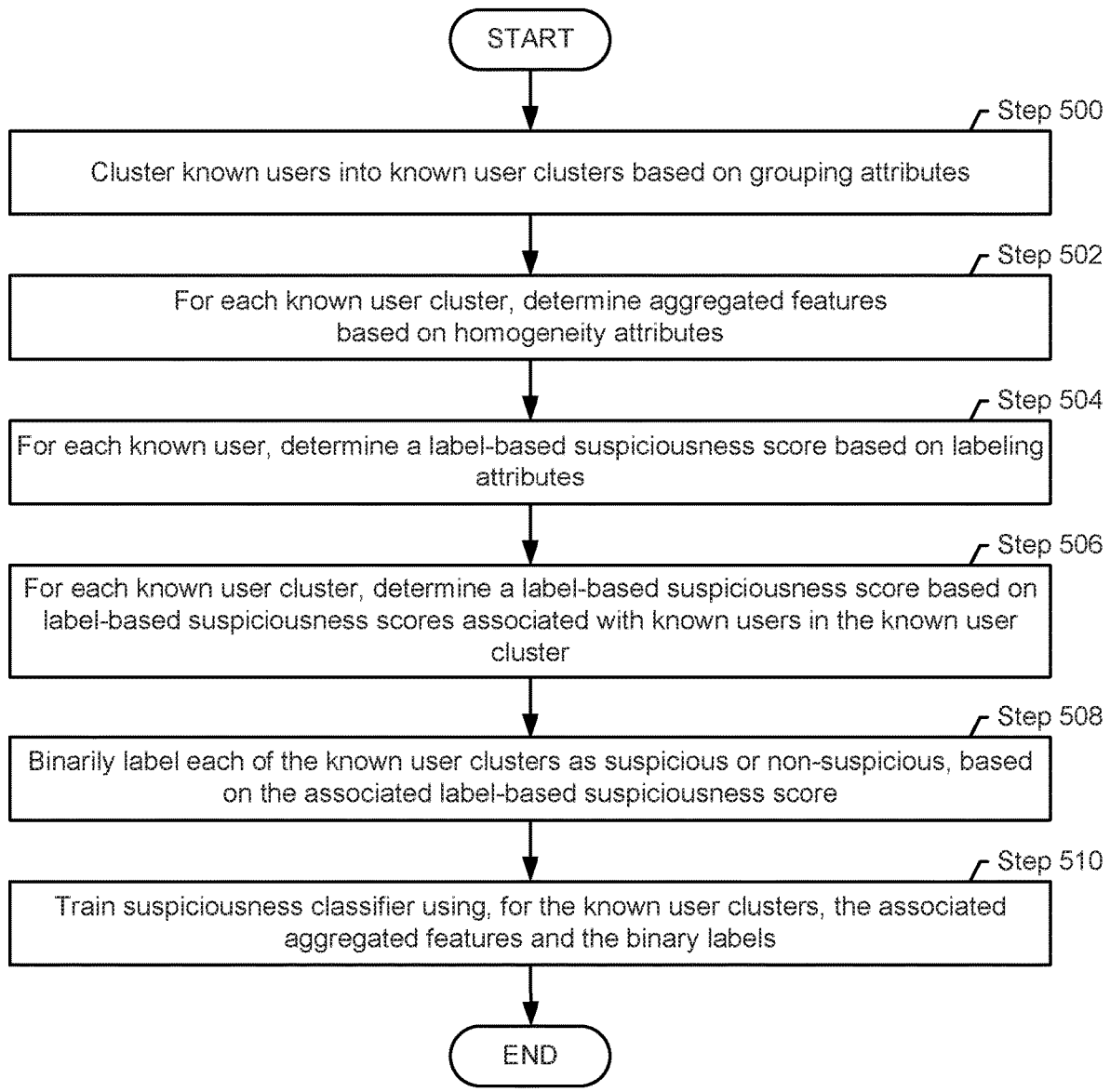
Figure 5B:
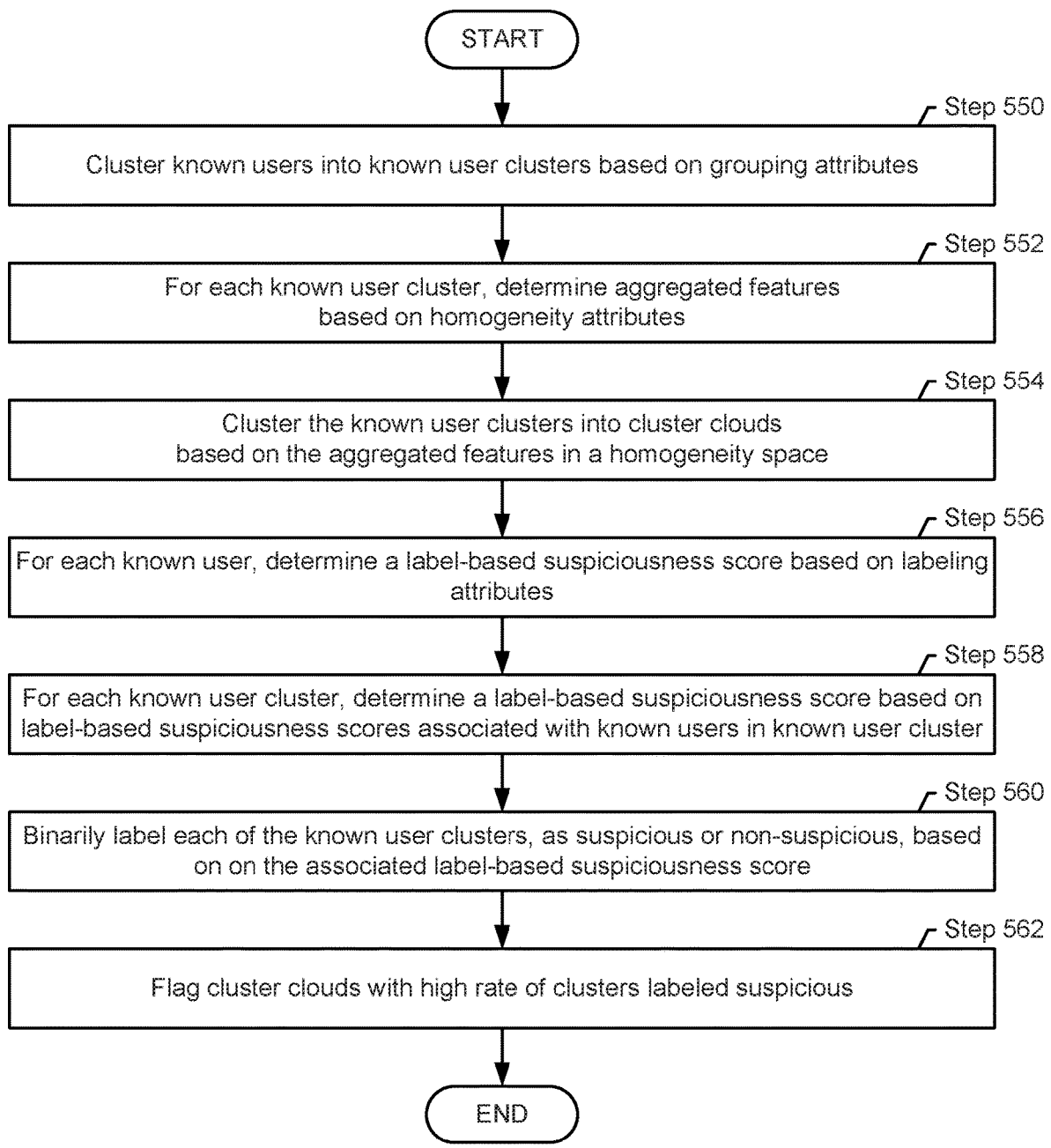

Turning to FIG. 3, a flowchart describing a method for detecting fraud rings, in accordance with one or more embodiments, is shown. The method relies on algorithms that have been established or trained based on data for known users, i.e., users for which it has been determined whether they should be considered fraudulent or legitimate. FIG. 5A and FIG. 5B describe how these algorithms may be established. The method of FIG. 3 may be performed whenever unknown users are to be analyzed. This may be done at regular time intervals, upon request, or whenever a certain number of unknown users has been detected.

In Step 300, the unknown users are clustered into unknown user clusters based on grouping attributes. The grouping attributes may be gathered from various sources. For example, network communication-related grouping attributes may be gathered through examination of the network communications between the user device from which the unknown user connects and the software service. The network communications may reveal a physical address of the user device and/or and IP address of the physical device. Based on the IP address, additional information may be derived. For example, the user's internet service provider may be identified, and/or it may be determined whether the IP address is a data center or a proxy. As previously noted, various approaches may be used to perform the clustering, including methods that are overlap-based. Multiple clustering methods may also be used in parallel. In one or more embodiments, rule-based clustering is performed, based on the grouping attributes. Consider the example grouping attributes (202) of FIG. 2. In one example, the rule-based clustering is based on the device ID. In this case, all users with the same device ID are assigned to the same cluster. In another example, the rule-based clustering is based on the combination of the device ID and the Internet service provider. In this case, users with the same device ID but different Internet service providers would be assigned to different clusters. Alternative clustering methods may be machine learning-based. For example, a k-means clustering may be used. When Step 300 is performed, the unknown users may be added to existing clusters that include already known users resulting from previous executions of the described methods. In other words, new unknown user clusters are not necessarily established from scratch.

In Step 302, for each unknown user cluster, aggregated features are determined. The aggregated features are determined based on the homogeneity attributes of the unknown users in the unknown user cluster. Aggregated features may be determined in various ways as previously described with reference to FIG. 2. When, in Step 300, an unknown user cluster was generated by addition of one or more unknown users to an existing user cluster, the aggregated features which may have been previously calculated for the existing cluster, may change.

In Step 304, a predictive suspiciousness score is determined for each of the unknown user clusters. The suspiciousness score may quantify the suspiciousness of the associated unknown user cluster. In other words, the predictive suspiciousness score associated with a particular user cluster may predict how likely it is that users in the unknown user cluster intend to get involved in fraudulent activity. A low predictive suspiciousness score may suggest that the unknown user cluster is unlikely to be associated with a fraud ring, whereas a high predictive suspiciousness score may suggest that the unknown user cluster is likely to be associated with a fraud ring. The predictive suspiciousness score may be in a range of 0-1, 0-10, 0-100, or in any other range. The predictive suspiciousness score may be determined using two alternative approaches. A first approach is described in FIG. 4A, and a second approach is described in FIG. 4B. If multiple clustering methods are used in parallel for Steps 300 and 302, predictive suspiciousness scores may be determined for each of the clustering methods. In this case, an unknown user may eventually be evaluated based on the predictive suspiciousness scores indicating the highest risk, or an average of all predictive suspiciousness scores obtained using a weighted average of all of the clusters that the user is a member of. Further, if unknown clusters were obtained by adding unknown users to existing clusters, the predictive suspiciousness scores of the existing clusters may be updated by the execution of Step 304, to reflect the changes caused by the addition of the unknown users.

In Step 306, a test is performed for each of the unknown user clusters to determine whether the unknown user cluster is suspicious. The test may be performed by comparing the predictive suspiciousness score associated with the unknown user cluster to a specified threshold. If the predictive suspiciousness score exceeds the threshold, the unknown user cluster may be considered suspicious. The suspicious unknown user cluster is likely to be associated with a fraud ring. It is possible that multiple suspicious unknown user clusters are associated with the same fraud ring.

In Step 308, a protective action is taken for the suspicious unknown user cluster. Protective actions may be designed to prevent the users in the suspicious unknown user cluster from taking damaging actions. Protective actions may include reporting the users in the suspicious unknown user cluster to a human reviewer or to an agency. The human reviewer or agency may then decide whether the suspicious unknown user cluster is considered to be associated with a fraud ring. When multiple users require a review, the accounts of the users may be provided to the human reviewer in an ordered manner. Criteria to establish an order may include considerations such as the predictive suspiciousness score of the unknown user cluster that includes the user(s), how many accounts are pending for approval, whether the user(s) can cause damage in their current/next state, etc. Feedback obtained from the human reviewer may later be user to improve the accuracy of the clustering and/or classifier algorithms, as described in FIG. 5A and FIG. 5B.

Additionally or alternatively, the accounts of the users in the suspicious unknown user cluster may be locked, account privileges may be limited, etc.

Figure 4A:
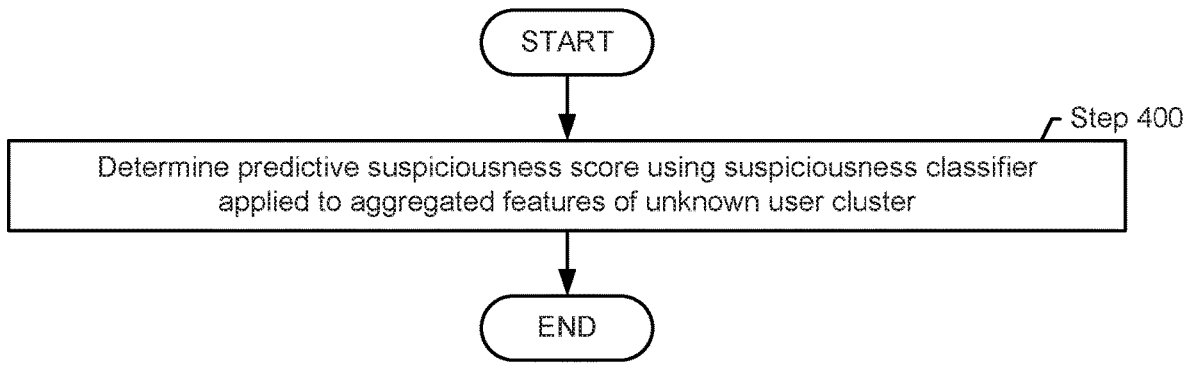
Figure 4B:
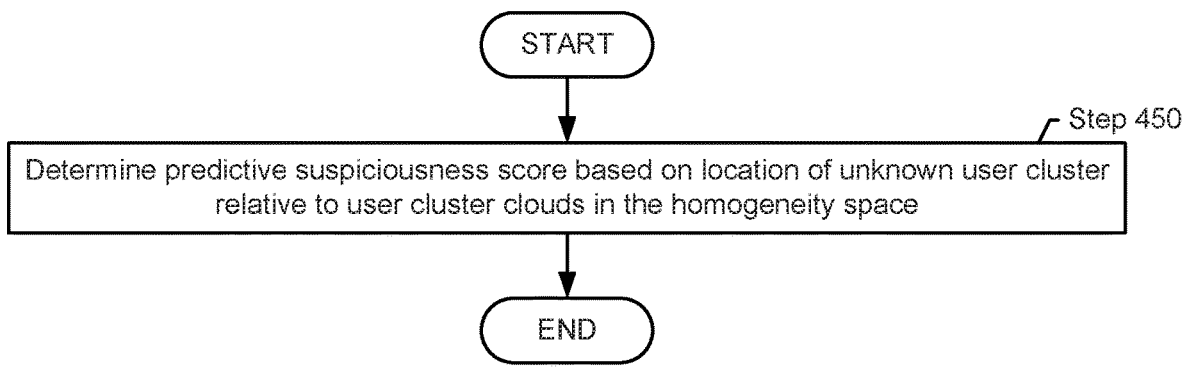

FIG. 4A and FIG. 4B show alternative methods for determining a predictive suspiciousness score (Step 304 of FIG. 3). While the method of FIG. 4A relies on a machine learning classifier, the method in FIG. 4B relies on cluster location considerations. More specifically, the method of FIG. 4A uses a supervised approach based on aggregated homogeneity features serving as the input to the machine learning classifier. For the training of the machine learning classifier, the labeling attributes may be used, as discussed below. In contrast, the method of FIG. 4B uses an unsupervised approach which may be applicable when labeling attributes are sparse.

Turning to FIG. 4A, a classifier-based method for determining a predictive suspiciousness score for an unknown user cluster, in accordance with one or more embodiments, is shown. A prerequisite for the execution of the method of FIG. 4A is a training, as described in FIG. 5A. In Step 400, a machine learning classifier may be used to make classifications such as "suspicious" and "non-suspicious". The machine learning classifier may be any type of classifier capable of making binary predictions such as a decision tree, a random forest, a support vector machine, an XGBoost classifier, etc. The machine learning classifier may accept some or all of the homogeneity attributes in the aggregated features obtained in Step 302 as inputs, to make a prediction regarding the likeliness of the unknown user cluster being associated with a fraud ring. The homogeneity attributes may be processed to meet certain format requirements of the suspiciousness classifier. For example, the homogeneity attributes may be arranged in a feature vector. The homogeneity attributes to be included in the feature vector may have been established when the suspiciousness classifier was trained, as discussed below with reference to FIG. 5A. After completion of Step 400, the predictive suspiciousness score for the unknown user cluster may be returned. As previously noted, an unknown user cluster may be a user cluster consisting of all unknown users, or a combination of known and unknown users. For example, the unknown user cluster may be a cluster consisting of known users and one or multiple newly added unknown users.

The predictive suspiciousness score may reflect the confidence of the classification as "suspicious" and "non-suspicious". The predictive suspiciousness score may be, for example, a percentage. Assume, for example, that an unknown user cluster is considered to be suspicious with a 95% confidence and innocuous with a 5% confidence. This 95% predictive suspiciousness score expresses a high confidence that the unknown user cluster is actually fraudulent, for example, in comparison to a 40% predictive suspiciousness score obtained for another unknown user cluster.

Turning to FIG. 4B, a cluster location-based method for determining a predictive suspiciousness score for an unknown user cluster, in accordance with one or more embodiments, is shown.

Figure 6:
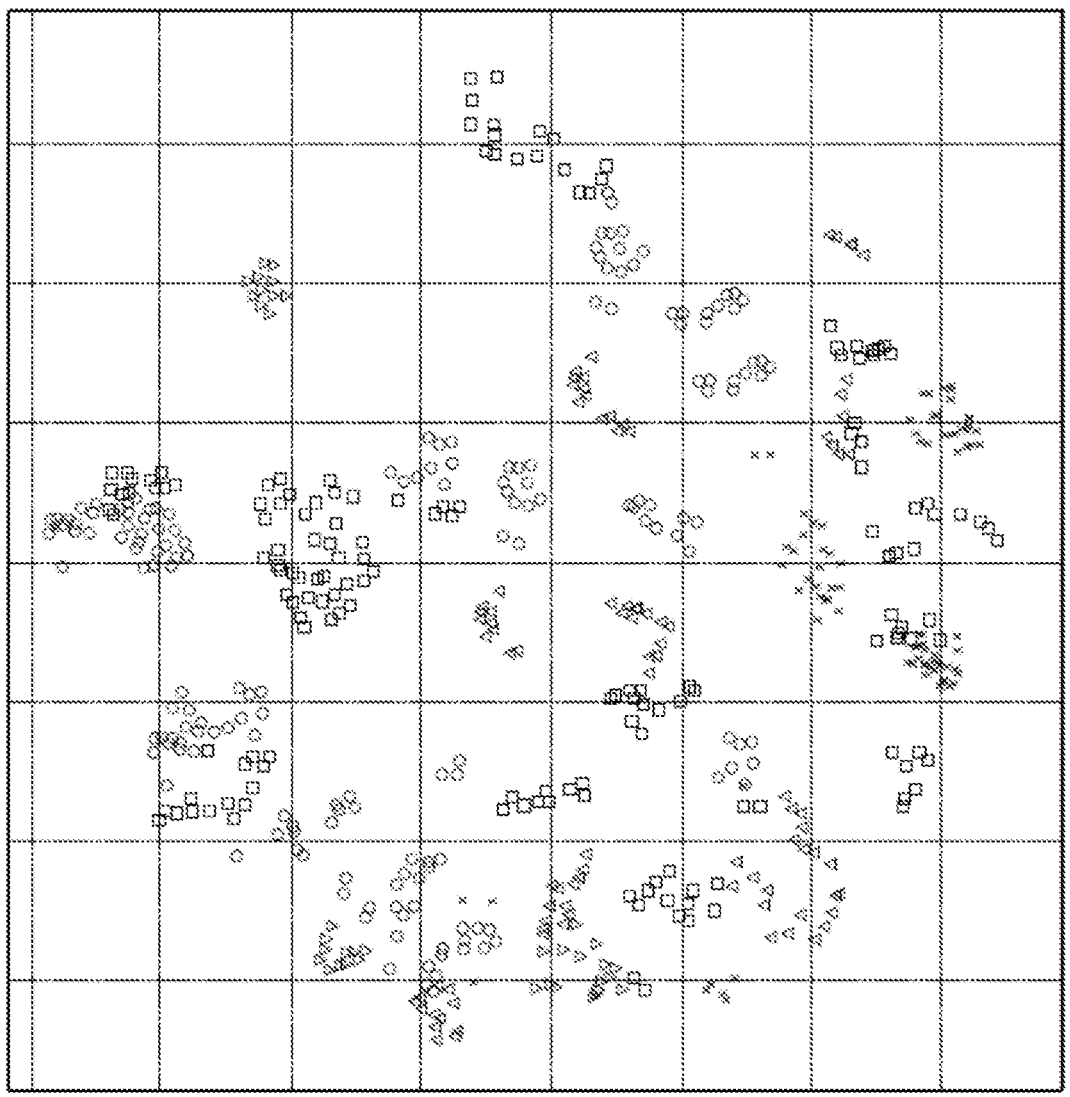
FIG. 6 shows an example visualization of cluster clouds, in accordance with one or more embodiments.

In Step 450, a location of the unknown user cluster relative to cluster clouds in a homogeneity space is determined. A description of the homogeneity space is provided below, and an example of a homogeneity space is shown in FIG. 6. The cluster clouds may initially be formed from known user clusters using content of the historical account database, as described with reference to FIG. 5B. Unknown user clusters may be added over time, as discussed below. The resulting homogeneity space in which known and/or unknown user clusters exist may be high-dimensional. Accordingly, a dimensionality reduction may be performed to determine the location of the user clusters in a lower-dimensional space. The dimensionality reduction may be performed using, for example, a principal component analysis (PCA) or a sparse PCA. In one or more embodiments, the unknown user cluster is assigned to one of the cluster clouds in the homogeneity space. The assignment of the unknown cluster may be performed by a clustering operation as described in FIG. 5B for known user clusters. Cluster clouds thus grow, as unknown user clusters are added. One distinction between known user clusters and unknown user clusters in a cluster cloud is that for the known user clusters, aggregated features ((208) in FIG. 2) are available, whereas no aggregated features are available for the unknown user clusters. Alternatively, when the clustering operation is performed, a completely new cluster cloud may be formed when a set of unknown user clusters are collocated in the homogeneity space in a region not currently occupied by a cluster cloud.

The predictive suspiciousness score of the unknown user cluster may then be determined based on: (i) A fraction of suspicious known user clusters vs non-suspicious known user clusters in the cluster cloud, where more suspicious known user clusters results in a higher predictive suspiciousness score. An unknown user cluster may be determined to be non-fraudulent and receive a relatively low predictive suspiciousness score, if the fraction of suspicious known user clusters in the cluster cloud is considered low. The unknown user cluster may be determined to be fraudulent and receive a relatively high predictive suspiciousness score, if the fraction of suspicious known user clusters in the cluster cloud is considered high, e.g., in case of a cluster cloud that was flagged as suspicious). (ii) A proximity of the unknown user cluster to known suspicious clusters, where a closer proximity results in a higher predictive suspiciousness score. For example, an unknown user cluster that is adjacent to a known suspicious cluster may receive a higher predictive suspiciousness score than an unknown user cluster that is adjacent to a known non-suspicious user cluster. Additionally, the score determination may be further based upon a prior predictive suspiciousness score that was assigned to a user cluster, e.g., prior to adding additional users to the cluster. In other words, a previously obtained suspiciousness score of a known user cluster may be updated based on (i) and/or (ii) when the known user cluster becomes an unknown user cluster as a result of an addition of one or more unknown users.

Turning to FIG. 5A, a method for training a suspiciousness classifier, in accordance with one or more embodiments, is shown. The method of FIG. 5A may be used in preparation of executing the method of FIG. 3, using the suspiciousness classifier approach of FIG. 4A. Unlike the steps described in FIG. 3 which primarily involve unknown users, the steps described in FIG. 5A involve known users, whose data are used to train the suspiciousness classifier.

In Step 500, the known users are clustered into known user clusters based on grouping attributes. The grouping attributes may be gathered from various sources. The clustering of known users into known user clusters may be similar to the clustering of unknown users into unknown user clusters (as described in Step 300 of FIG. 3), because for both the unknown users and the known users, similar grouping attributes are typically available. As previously noted, various approaches may be used to perform the clustering, including methods that are overlap-based. Multiple clustering methods may also be used in parallel.

Step 502, for each known user cluster, aggregated features are determined. The aggregated features are determined based on the homogeneity attributes of the known users in the known user cluster. The determining of aggregated features for the known users may be similar to the determining of aggregated features for the unknown users (as described in Step 302 of FIG. 3), because for both the unknown users and the known users, similar homogeneity features are typically available.

In Step 504, a label-based suspiciousness score is determined for each known user, based on the labeling attributes. Unlike the suspiciousness score used for the unknown users (FIGS. 3, 4A, and 4B) to quantify the likeliness of unknown users being fraudulent, the label-based suspiciousness score is based on historical data (the labeling attributes), which document the presence or absence of fraudulent activity. As initially described in FIG. 2, labeling attributes may include various observations that may serve as indicators for fraudulence. The labeling attributes shown in FIG. 2 are declined transactions and write-offs, but other indicators for fraudulence may be alternatively or additionally monitored. Each of the labeling attributes individually may vote for or against fraudulence, thereby contributing to the label-based suspiciousness score. The combination of all labeling attributes may be considered for the label-based suspiciousness score. Different labeling attributes may be weighted differently, based on how strongly they are thought to be indicators for fraudulence. Assigning a label-based suspiciousness score to a known user may be understood as a fuzzy labeling, where a higher label-based suspiciousness score suggests that the known user is more likely to be fraudulent.

In Step 506, a label-based suspiciousness score is determined for each known user cluster, based on the label-based suspiciousness scores associated with the known users in the known user cluster. The label-based suspiciousness score for a known user cluster may be obtained, for example, by calculating a mean of the label-based suspiciousness scores of the known users in the known user cluster. Assigning a label-based suspiciousness score to a known user cluster may be understood as a fuzzy labeling, where a higher label-based suspiciousness score suggests that the known user cluster is more likely to include fraudulent users. If multiple clustering methods are used in parallel for Steps 500, label-based suspiciousness scores may be determined for each of the clustering methods.

In Step 508, each of the known user clusters is binarily labeled as either suspicious or non-suspicious, based on the associated label-based suspiciousness score. The binary labeling may be performed based on whether the label-based suspiciousness scores of the known user clusters do or do not exceed a specified threshold. The binary labeling may also be performed based on feedback provided by the human reviewer on previously unknown user clusters, in Step 308 of FIG. 3. Because the human review may be more trustworthy than the fuzzy-labeling, a sample that is labeled by the human reviewer may be weighted higher than a sample obtained by fuzzy-labeling, for the purpose of training the suspiciousness classifier, in Step 510.

In Step 510, the suspiciousness classifier is trained using the aggregated features and the binary labels associated with the known user clusters. More specifically, the homogeneity attributes in the aggregated features are used as the inputs to the suspiciousness classifier being trained to predict the binary labels. Because the majority of known user clusters may consist of legitimate users, known user clusters that are fraudulent may be weighted higher than naturally observed in the historical account database.

Depending on the type of suspiciousness classifier being used, the training may differ. For example, if a random forest classifier is used as the machine learning classifier, operations are performed to establish the trees of the random forest, e.g., by arranging the aggregated features for the known user clusters into subsets that form nodes of decision trees, and with the binary outcomes forming leaves of the decision trees. The random forest may be trained using a gradient boosting algorithm. The gradient boosting algorithm may turn an initially weak learner (e.g., a single tree with a relatively poor predictive accuracy) into a stronger learner (e.g., a random forest that includes multiple trees, and that has a higher predictive accuracy). The gradient boosting is performed stage-wise, with a new weak learner (i.e. another tree) added at each stage. The gradient boosting may be performed using a loss function, e.g., a logarithmic loss function, when performing classifications. Using the loss function, a weak learner (i.e. a single tree) is established in an attempt to minimize the loss function by obtaining a maximum predictive accuracy by the weak learner. When progressing through the stages of learning, trees are added one at a time, and a gradient descent procedure is used to minimize the loss when adding these trees. After calculating the loss for an existing tree or set of trees, another tree is added to reduce the loss using the gradient descent procedure, (i.e., following the gradient). The tree being added is parameterized (e.g., by selecting features to be used in the tree) to reduce the residual loss.

If an XGBoost classifier is used as the suspiciousness classifier, operations are performed to iteratively learn weak classifiers and add them to form a final strong classifier. XGBoost is a gradient boosting-based implementation of random forests. The training of the XGBoost classifier may be performed iteratively to optimize the chosen loss function. During the training, the parameters of the predictive model (which, in the case of the XGBoost classifier, is formed by an ensemble of trees) may be determined. The XGBoost classifier supports different loss functions, and accordingly, the mean squared error loss, a logistic loss, a weighted logistic loss, etc., may be used for training. At each iterative step of the training, one tree of the tree ensemble may be optimized. Subsequently, a tree ensemble may be obtained by additive combination of these trees.

Training the suspiciousness classifier may further include additional steps. Prior to the training of the suspiciousness classifier, the aggregated features and binary labels of the known user clusters may be sampled to obtain training data and validation data. Training data and validation data may be obtained based on a ratio. For example, 80% of the data may be used as training data and 20% of the data may be used as validation data. The selection of training data and validation data may be performed pseudo-randomly. Further, the aggregated features and binary labels of the known user clusters may also be sampled to obtain a certain ratio of suspicious vs non-suspicious.

As previously noted, the training of the suspiciousness classifier may be performed iteratively. After training the suspiciousness classifier based on training data, the trained suspiciousness classifier may be assessed using the validation data to determine the accuracy of the suspiciousness classifier. The training of the suspiciousness classifier may also involve the tuning of hyperparameters. After adjusting one or more hyperparameters of the suspiciousness classifier, the iterative training may be repeated. Cycles of adjusting hyperparameters and training the suspiciousness classifier may be repeated until satisfactory predictive performance is achieved.

Turning to FIG. 5B, a method for identifying and labeling cluster clouds, in accordance with one or more embodiments, is shown. The method of FIG. 5B may be used in preparation of executing the method of FIG. 3 using the location-based approach of FIG. 4B. Unlike the steps described in FIG. 3 which primarily involving unknown users, the steps described in FIG. 5B involve known users, whose data are used to identify and label the cluster clouds. At least some of the steps of FIG. 5B may be executed in conjunction with the steps of FIG. 3 and FIG. 4B. Specifically, for example, a clustering of user clusters into cluster clouds, as described in Step 554 of FIG. 5B being performed for known user clusters, may be performed simultaneously with the clustering of unknown users as described in Step 450 of FIG. 4B.

In Step 550, the known users are clustered into known user clusters based on grouping attributes. The grouping attributes may be gathered from various sources. The clustering of known users into known user clusters may be similar to the clustering of unknown users into unknown user clusters (as described in Step 300 of FIG. 3), because for both the unknown users and the known users, similar grouping attributes are typically available. As previously noted, various approaches may be used to perform the clustering, including methods that are overlap-based. Multiple clustering methods may also be used in parallel.

Step 552, for each known user cluster, aggregated features are determined. The aggregated features are determined based on the homogeneity attributes of the known users in the known user cluster. The determining of aggregated features for the known users may be similar to the determining of aggregated features for the unknown users (as described in Step 302 of FIG. 3), because for both the unknown users and the known users, similar homogeneity features are typically available.

In Step 554, the known user clusters are clustered into cluster clouds, based on the aggregated features in the homogeneity space. Hierarchical clustering or any other method of clustering may be used. Because the dimensionality of the homogeneity space may be high, dimensionality reduction methods (e.g., using a principal component analysis (PCA), or sparse-PCA) may be performed prior to performing the clustering. The operation may be performed in conjunction with the clustering described in Step 450 of FIG. 4B.

In Step 556, a label-based suspiciousness score is determined for each known user, based on labeling attributes. As initially described in FIG. 2, labeling attributes may include various observations that may serve as indicators for fraudulence. The labeling attributes shown in FIG. 2 are declined transactions and write-offs, but other indicators for fraudulence may be alternatively or additionally monitored. Each of the labeling attributes individually may vote for or against fraudulence, thereby contributing to the label-based suspiciousness score. The combination of all labeling attributes may be considered for the label-based suspiciousness score. Different labeling attributes may be weighted differently, based on how strongly they are thought to be indicators for fraudulence. Assigning a label-based suspiciousness score to a known user may be understood as a fuzzy labeling, where a higher label-based suspiciousness score suggests that the known user is more likely to be fraudulent.

In Step 558, a label-based suspiciousness score is determined for each known user cluster, based on the label-based suspiciousness scores associated with the known users in the known user cluster. The label-based suspiciousness score for a known user cluster may be obtained, for example, by calculating a mean of the label-based suspiciousness scores of the known users in the known user cluster. Assigning a label-based suspiciousness score to a known user cluster may be understood as a fuzzy labeling, where a higher label-based suspiciousness score suggests that the known user cluster is more likely to include fraudulent users.

In Step 560, each of the known user clusters is binarily labeled as either suspicious or non-suspicious, based on the associated label-based suspiciousness score. The binary labeling may be performed based on whether the label-based suspiciousness scores of the known user clusters do or do not exceed a specified threshold. The binary labeling may also be performed based on feedback provided on previously unknown user clusters by the human reviewer, in Step 308 of FIG. 3. Because the human review may be more trustworthy than the fuzzy-labeling, a sample that is labeled by the human reviewer may be weighted higher than a sample obtained by fuzzy-labeling.

In Step 562, each of the cluster clouds, obtained in Step 554 is assigned a label-based suspiciousness score, according to the fraction of suspicious known user clusters in the cluster cloud. Cluster clouds with a label-based suspiciousness score exceeding a threshold may be flagged as suspicious. During the execution of the method of FIG. 4B, the label-based suspiciousness score, and/or cluster clouds flagged as suspicious may be considered, to determine whether an unknown user cluster is suspicious.

FIG. 6 shows an example visualization (600) of cluster clouds, in accordance with one or more embodiments. In the example, each point (symbol), represents a user cluster. The user clusters are embedded in the homogeneity space. The homogeneity space may be formed based on the homogeneity attributes. While the homogeneity space may have n-dimensions for n homogeneity attributes being considered, frequently the dimensionality is reduced, as previously discussed. In the example of FIG. 6, the homogeneity space was reduced to two dimensions (2D). A t-Distributed Stochastic Neighbor Embedding (t-SNE) feature reduction method was used to decrease the dimensionality to 2D. In the homogeneity space, a hierarchical clustering method was used to cluster the points to cluster clouds. Each cluster cloud in the example is coded using a unique symbol. Further, each user cluster that has a suspiciousness score exceeding a threshold is marked with an "x" symbol. The example visualization (600) illustrates how an unknown user cluster may be identified as suspicious or non-suspicious, based on the location of the unknown user cluster in the homogeneity space. When the unknown user cluster is found to be located among the known user clusters marked suspicious ("x"), the unknown user cluster is considered suspicious. If the unknown user cluster is found to be located elsewhere, it may be considered non-suspicious.

The following example briefly illustrates steps of the previously described flowcharts as they may be performed in an actual scenario:
(i) Users are clustered according to their exact ID (the exact ID may be a unique fingerprint of the user device, e.g., a MAC address). As a result, each generated user cluster contains all users that signed-up from the same device (grouping attributes=[contains_exact ID]). The clustering of users into user clusters may be performed for known users and for unknown users.
(ii) For each user, a test is performed to determine whether the user's email address contains a year of birth, and whether it contains an underscore. (homogeneity attributes=[contains_year, contains_underscore]). Next, the fraction of users within the user cluster which satisfy [contains_year, contains_underscore] are computed, yielding two float values that describe the user cluster. These aggregated features may be calculated at very early stages in the life of a cluster—as soon as the email address is provided by the users. Calculating the aggregated features is possible for known users and unknown users.
(iii) For each known user in the known user clusters, a test is performed to determine whether the known user was declined/cancelled/found fraudulent. Based on the outcome of the test, a suspiciousness score is assigned to the known user. Next, the suspiciousness scores of all known users are aggregated to obtain a suspiciousness score for the known user clusters. A binary "fraudulent/non-fraudulent" label may be assigned, based on the suspiciousness score.
Using the cluster cloud approach:
   (iv-a) The known user clusters are clustered into cluster clouds according to their aggregated features using hierarchical clustering.
   (v-a) For each cluster-cloud, the fraction of suspicious known user clusters is calculated. Cluster clouds with a higher fraction of suspicious known user clusters reflect regions in the homogeneity space where a higher probability of fraud rings exists.
   (vi-a) Unknown user clusters that turn out to be located in the most suspicious cluster clouds are forwarded to an analyst for further inspection.
Using the suspiciousness classifier approach:
   (iv-b) The suspiciousness classifier is trained using the aggregated features and the binary labels. In the example, the suspiciousness classifier is a random forest type classifier.
   (v-b) The trained suspiciousness classifier is applied to predict whether unknown user clusters are fraudulent
   (vi-b) Unknown user clusters with a high or highest fraudulence score, based on the classification, are forwarded to an analyst for further inspection.

Various embodiments of the disclosure have one or more of the following advantages. Embodiments of the disclosure enable the detection of fraud rings. As fraud-rings get more sophisticated and advanced, two major problems arise: (i) Frequently, fraud rings are using automatic tools for their attacks and, as a result, expert analysts' inspection of every single case becomes tedious and expensive. (ii) Most of the time, when such fraudster creates an account, nothing about that particular account seems suspicious when reviewed in isolation, until this account causes a damage/loss, making it hard for analysts to determine that this user is indeed fraudulent. Embodiments of the disclosure address these issues by automating the analysis of unknown user accounts to determine the presence of fraud rings. In particular, unknown users are grouped for the purpose of the fraudulence analysis rather than reviewing the unknown users in isolation. Embodiments of the disclosure may be used to prevent malicious activities such as using stolen identities to create fake merchant accounts for money movement fraud, payroll fraud or loan fraud. Fraud rings may be detected prior to causing damage. More broadly, embodiments of the disclosure may be employed to prevent cybercrime being committed by more or less sophisticated fraudsters organized in groups, thereby increasing the security of computing systems, data networks, and electronic transactions.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting fraud rings, comprising:
   clustering unknown users into unknown user clusters based on a grouping attribute;
   for each of the unknown user clusters, determining aggregated features comprising at least one quantification of at least one homogeneity attribute across the unknown users in the unknown user cluster, wherein known user clusters and the unknown user clusters are clustered into cluster clouds based on the at least one homogeneity attribute;
   for each of the unknown user clusters, determining a predictive suspiciousness score based on the aggregated features;
   determining that at least one of the unknown user clusters is suspicious based on the determined predictive suspiciousness scores, wherein determining that at least one of the unknown user clusters is suspicious comprises flagging at least one of the cluster clouds based on the at least one cluster cloud comprising suspicious known user clusters and non-suspicious known user clusters with a ratio that exceeds a threshold; and
   taking a protective action for the at least one suspicious unknown user cluster.

2. The method of claim 1, wherein taking the protective action comprises at least one selected from a group consisting of:
   initiating a review of the at least one suspicious unknown user cluster, and
   blocking user accounts associated with the at least one suspicious unknown user cluster.

3. The method of claim 1, wherein the grouping attribute is user environment-related.

4. The method of claim 1, wherein the at least one homogeneity attribute is user-related.

5. The method of claim 1, wherein determining the predictive suspiciousness score based on the aggregated features comprises:
   for each of the unknown user clusters, applying a suspiciousness classifier to the aggregated features of the unknown user cluster.

6. The method of claim 5, wherein the suspiciousness classifier is based on a random forest-type algorithm.

7. The method of claim 1, wherein determining the predictive suspiciousness score based on the aggregated features comprises:
   determining locations of the unknown user clusters relative to previously identified known user clusters in a homogeneity space established based on the at least one homogeneity attribute.

8. The method of claim 7, wherein determining the predictive suspiciousness score based on the aggregated features further comprises:
   assigning a higher predictive suspiciousness score to a first of the unknown user clusters based on the first of the unknown user clusters being assigned, in the homogeneity space, to a previously identified cluster cloud flagged as fraudulent; and
   assigning a lower predictive suspiciousness score to a second of the unknown user clusters based on the second of the unknown user clusters being assigned in the homogeneity space, to a previously identified cluster cloud not flagged as fraudulent.

9. The method of claim 7, wherein determining the predictive suspiciousness score based on the aggregated features further comprises:
   assigning a higher predictive suspiciousness score to a first of the unknown user clusters based on the first of the unknown user clusters being adjacent to a known suspicious user cluster, in the homogeneity space; and
   assigning a lower predictive suspiciousness score to a second of the unknown user clusters based on the second of the unknown user clusters being adjacent to a known non-suspicious user cluster, in the homogeneity space.

10. The method of claim 1, wherein determining the predictive suspiciousness score based on the aggregated features comprises:
    for one of the at least one unknown user clusters, updating a previously obtained predictive suspiciousness score for the unknown user cluster.

11. A method for detecting fraud rings, comprising:
    clustering known users into known user clusters based on a grouping attribute;
    for each of the known user clusters, determining aggregated features comprising at least one quantification of at least one homogeneity attribute across the known users in the known user cluster;
    for each of the known users, determining a label-based suspiciousness score based on at least one labeling attribute, wherein the at least one labeling attribute identifies a fraud-related event;
    for each of the known user clusters, determining the label-based suspiciousness score based on the label-based suspiciousness scores associated with the known users in the known user cluster;
    binarily labeling each of the known user clusters based on the associated label-based suspiciousness score and a suspiciousness threshold to distinguish suspicious known user clusters from non-suspicious known user clusters; and training a suspiciousness classifier using the at least one homogeneity attribute and the binary label associated with the known user clusters.

12. The method of claim 11, wherein the suspiciousness classifier is based on a random forest-type algorithm.

13. The method of claim 11,
wherein the grouping attribute is user environment-related, and
wherein the at least one homogeneity attribute is user-related.

14. A method for detecting fraud rings, comprising:
clustering known users into known user clusters based on a grouping attribute;
for each of the known user clusters, determining aggregated features comprising at least one quantification of at least one homogeneity attribute across the known users in the known user cluster;
clustering the known user clusters into cluster clouds based on the at least one homogeneity attribute in the aggregated features;
for each of the known users, determining a label-based suspiciousness score based on at least one labeling attribute, wherein the at least one labeling attribute identifies a fraud-related event;
for each of the known user clusters, determining the label-based suspiciousness score based on the label-based suspiciousness scores associated with the known users in the known user cluster;
binarily labeling each of the known user clusters based on the associated label-based suspiciousness score and a suspiciousness threshold to distinguish suspicious known user clusters from non-suspicious known user clusters; and
flagging at least one of the cluster clouds based on the at least one cluster cloud comprising suspicious known user clusters and non-suspicious known user clusters with a ratio that exceeds a threshold.

15. The method of claim 14, wherein clustering the known user clusters into cluster clouds is performed using a hierarchical clustering algorithm.

16. The method of claim 14,
wherein the clustering the known user clusters into cluster clouds is performed in a homogeneity space established based on the at least one homogeneity attribute, and
wherein the clustering the known user clusters into cluster clouds comprises reducing a dimensionality of the homogeneity space.

17. The method of claim 16, wherein the dimensionality reduction comprises a principal component analysis.

18. A system for detecting fraud rings, the system comprising:
a computer processor; and
an account assessment engine executing on the computer processor configured to:
cluster unknown users into unknown user clusters based on a grouping attribute;
for each of the unknown user clusters, determine aggregated features comprising at least one quantification of at least one homogeneity attribute across the unknown users in the unknown user cluster, wherein known user clusters and the unknown user clusters are clustered into cluster clouds based on the at least one homogeneity attribute;
for each of the unknown user clusters, determine a predictive suspiciousness score based on the aggregated features;

determine that at least one of the unknown user clusters is suspicious based on the determined predictive suspiciousness scores, wherein determining that at least one of the unknown user clusters is suspicious comprises flagging at least one of the cluster clouds based on the at least one cluster cloud comprising suspicious known user clusters and non-suspicious known user clusters with a ratio that exceeds a threshold; and
take a protective action for the at least one suspicious unknown user cluster.

19. The system of claim 18, wherein determining the predictive suspiciousness score based on the aggregated features comprises:
for each of the unknown user clusters, applying a suspiciousness classifier to the aggregated features of the unknown user cluster.

20. The system of claim 18, wherein determining the predictive suspiciousness score based on the aggregated features comprises:
determining locations of the unknown user clusters relative to previously identified known user clusters in a homogeneity space established based on the at least one homogeneity attribute.

21. A system for detecting fraud rings, the system comprising:
a computer processor; and
an account assessment engine executing on the computer processor configured to:
cluster known users into known user clusters based on a grouping attribute;
for each of the known user clusters, determine aggregated features comprising at least one quantification of at least one homogeneity attribute across the known users in the known user cluster;
for each of the known users, determine a label-based suspiciousness score based on at least one labeling attribute, wherein the at least one labeling attribute identifies a fraud-related event;
for each of the known user clusters, determine the label-based suspiciousness score based on the label-based suspiciousness scores associated with the known users in the known user cluster;
binarily label each of the known user clusters based on the associated label-based suspiciousness score and a suspiciousness threshold to distinguish suspicious known user clusters from non-suspicious known user clusters; and
train a suspiciousness classifier using the at least one homogeneity attribute and the binary label associated with the known user clusters.

22. A system for detecting fraud rings, the system comprising:
a computer processor; and
an account assessment engine executing on the computer processor configured to:
cluster known users into known user clusters based on a grouping attribute;
for each of the known user clusters, determine aggregated features comprising at least one quantification of at least one homogeneity attribute across the known users in the known user cluster;
cluster the known user clusters into cluster clouds based on the at least one homogeneity attribute in the aggregated features;
for each of the known users, determine a label-based suspiciousness score based on at least one labeling attribute, wherein the at least one labeling attribute identifies a fraud-related event;

for each of the known user clusters, determine the label-based suspiciousness score based on the label-based suspiciousness scores associated with the known users in the known user cluster;

binarily label each of the known user clusters based on the associated label-based suspiciousness score and a suspiciousness threshold to distinguish suspicious known user clusters from non-suspicious known user clusters; and flag at least one of the cluster clouds based on the at least one cluster cloud comprising suspicious known user clusters and non-suspicious known user clusters with a ratio that exceeds a threshold.

* * * * *